United States Patent [19]

Clark et al.

[11] 3,936,058
[45] Feb. 3, 1976

[54] TRANSVERSE STIFFNESS AUGMENTATION BEARING

[75] Inventors: Thomas S. Clark, Monte Sereno; Hugh M. Reynolds, San Jose, both of Calif.

[73] Assignee: The United States of America as represented by the Secretary of the Navy, Washington, D.C.

[22] Filed: Sept. 12, 1974

[21] Appl. No.: 505,430

[52] U.S. Cl. .................................. 277/88; 60/232
[51] Int. Cl.² .......................................... F02K 1/24
[58] Field of Search ............ 139/625.35; 277/30, 88; 60/232; 248/358; 285/97, 263, DIG. 1

[56] References Cited
UNITED STATES PATENTS 2,846,242  8/1958  Drake .................................. 285/263
3,698,192  10/1972  Febure .......................... 239/265.35

Primary Examiner—Robert I. Smith
Attorney, Agent, or Firm—R. S. Sciascia; R. F. Beers; P. Schneider

[57] ABSTRACT

A universal joint permitting relative angular deflection of two members, provided with transverse stiffness augmentation means which minimize rotational performance penalties. One member contemplates a receptacle adapted to receive in spaced-apart relation therefrom an annular plug formed on the other member. A rolling seal is positioned between the receptacle and plug. Tabs, segments or rings are placed on the annular plug and/or the confronting wall of said one member to increase the transverse stiffness under all load conditions, particularly at angle orientations of the aforesaid two members.

8 Claims, 3 Drawing Figures

TRANSVERSE STIFFNESS AUGMENTATION BEARING

This invention comprises a transverse stiffness augmentation bearing for a universal joint which employs a fluid supported membrane as a deformable load-bearing member.

BACKGROUND OF THE INVENTION

The type of universal joint employing a fluid bearing with which the present invention is adapted to be used is described in LeFebre U.S. Pat. No. 3,698,192. Such a universal joint includes two members which are connected together in such a way that the relative angular orientation of the members with respect to each other can be varied. One of the members is provided with a receptacle means adapted to receive in spaced apart relation therefrom an annular plug element formed on the other member. A fluid supported membrane in the form of an annular tube or bladder filled with fluid acts as a rolling seal and is positioned between the periphery of the receptacle and the periphery of the plug. This fluid supported membrane enables the efficient use of the bearing under circumstances in which there is no axial load or in which there is an axial load component tending to move the two members apart or push them together. A characteristic of this type of universal joint is that a relatively low force is required to actuate the joint.

In the use of the foregoing type of universal joint, particularly when used as a load bearing joint and seal interposed between a movable nozzle and a fixed nozzle support in reaction motor systems employing movable nozzles for directional control, problems arise when changing axial movement to a side movement of the whole motor assembly. When the motor is turned, an angle orientation is effected which produces a tendency for the assembly to move sideways and pinch the bladder, which when repeated often enough, will destroy the bladder. This problem does not occur when the force is aligned axially.

BRIEF DESCRIPTION OF THE INVENTION

According to the invention, this problem is overcome by the use of segments, rings or tabs placed in mill slots on the circumference of the annular plug, either on the inner diameter and/or outer diameter of the annular plug and on the confronting surface, such that they rub on the rolling surfaces under all load conditions and maintain substantially uniform spacing between the two connected members, thereby preventing bladder pinching. The minimum rubbing loads occur at the unloaded or ambient conditions. As pressure (load) is increased, the bearings are placed in compression due to structural deformation causing increased friction and increased torque penalty (friction loss). When the movable part on nozzle is vectored, that is not at null, one-half of the tabs, segments or rings remains engaged at all times providing the minimum stiffness augmentation and minimum torque penalty. At null, corresponding to an angle orientation of zero degrees, the total number of tabs, rings or segments are engaged and provided maximum torque penalty.

Among the advantages of the invention are the following: 1. Variable stiffness augmentation is possible by varying the number, size and location of the tabs, rings or segments which in themselves constitute bearings; 2. The rotational torque penalty is minimized at large angles where other rotational components are maximum; 3. The device of the invention is inexpensive, reliable, and does not interfere with angular rotational motion; and 4. The invention does not compromise the design or the annulus type of bladder-type fluid bearing and can be added at any time it is necessary to increase transverse stiffness at any operating condition without reducing angular clearance between the rolling surfaces of the fluid supported bearing.

THE DRAWINGS

DESCRIPTION OF THE INVENTION

Figure 1:
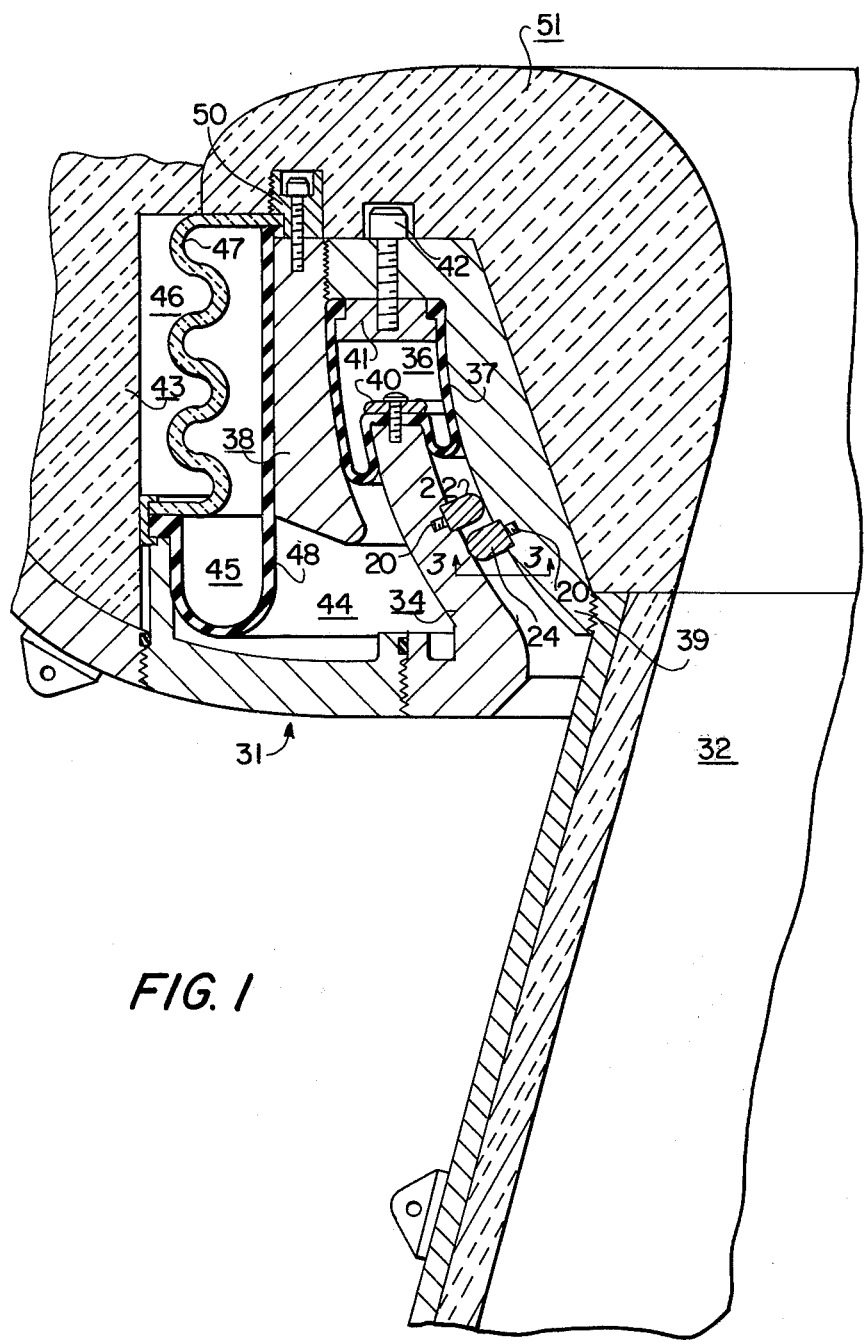
FIG. 1 is an axial sectional view of the aft end of a movable nozzle rocket motor employing an embodiment of the invention; showing the orientation of the components with stiffness augmentation tabs positioned on one side of the annulus plug.
Figure 2:
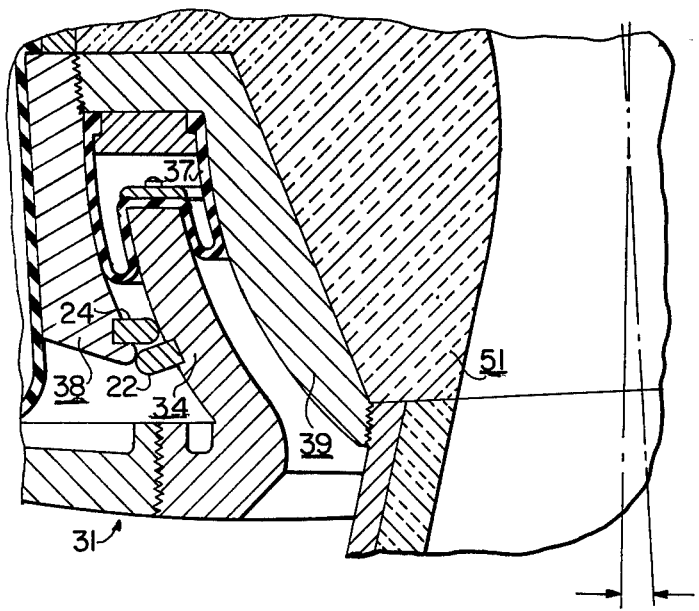
FIG. 2 is an axial sectional view similar to that of FIG. 1 but in a deflected position, showing how the stiffness augmentation tabs, segments or rings can be located on the other side of the annulus plug.

The movable rocket motor nozzle of FIGS. 1 and 2 is generally described in the aforesaid U.S. Pat. No. 3,698,192 and includes a movable nozzle 32 whose various positions can be adjusted through all quadrants as is known in the art by appropriate actuators actuating between the movable nozzle and a fixed nozzle support (end closure) 31. The particular method of actuating the movable nozzle is not critical with respect to this invention and may be any method for producing a relative angular deflection of the movable nozzle with respect to the case section, involving, by way of example, liquid injection of a fluid into the exhaust gas stream to cause a localized pressure gradient within the nozzle or the use of jet vanes or various types of hydraulic or mechanical or electrical actuators. By appropriate design it is possible to adjust the location of the pivot point of the movable nozzle, and as shown in FIG. 1 the pivot point P is located at the throat of the nozzle. This location of the pivot point substantially reduces the actuating forces required to move the nozzle 32 as explained in more detail in said aforesaid U.S. Pat. No. 3,698,192.

The end closure shown generally as 31 is provided with an axial opening through which the nozzle assembly 32 passes. End closure 31 has an annular plug member 34 affixed thereto which is received in an annular recess 36 formed in the movable nozzle assembly 32. In some previous embodiments, the plug and recess walls have had surfaces which were in the form of concentric cylinders. Such a structure is satisfactory if the degree of angular deflection is small or if the radial distance from the rolling seal means to the pivot point is large or if a self-restoring force is desired. FIG. 1 illustrates an embodiment in which the surfaces of the plug 34 and receptacle 36 are sections of concentric spheres centered at the pivot point P. This permits the seal to function with a lower actuating force. It should be noted, however, that as the diameter of seal increases, the functional difference between a spherical surface and a cylindrical surface may become sufficiently minor as not to warrant the increased fabrication costs. When spherical surfaces are employed, a liquid should be used as the fluid since a relatively constant volume within membrane 37 is required to prevent binding of the spherical surfaces.

Annular rolling seal means are provided by convoluted fluid supported membrane 37 which forms a rolling seal between the annular plug member 34 and the walls of elements 38 and 39 which form recess 36. Membrane 37 is secured to plug 34 and element 39 by annular clamping plates 40 and 41, respectively, which are bolted as by bolt 42 to the structural members as shown. It is preferable that at least two diametrically opposite bolt holes in member 41 extend completely through member 41 to provide fluid communication with the inside of recess 36 to permit the filling of the recess with the fluid which is contained therein. After the volume within receptacle 36 is filled, the ports would be sealed prior to final assembly. To provide adequate thermal insulation for the joint structure, a conventional insulating liner 43 is applied to the internal portion of the end support structure 31 and insulation of the movable nozzle joint is provided by a high temperature resistant grease placed in the volumes 44, 45 and 46 and maintained therein by means of flexible insulation such as graphite or silica cloths 47 and rubber sheets 48 respectively. Annular cap 50 is bolted to member 38 and is affixed to nozzle throat forming structure 51. It should be noted that insulation 47 and 48 does not act as the nozzle joint in the device shown but merely serves to provide a physical barrier to the heat generated in the combustion chamber.

The convoluted membrane 37 is an annular sealing means in the form of a fluid-filled bladder which in the space between plug 34 and the walls of elements 38 and 39 is convoluted to constitute a rolling seal means. The fluid supported membrane 37 acts as a deformable load-bearing member in a universal joint. Various fluids including gases, and liquids or combinations thereof will fill the volume in the bladder with the recess or receptacle 36. In applications where the operating conditions of temperature and pressure are precisely known and in which a lightweight seal is desirable, it may be preferable to utilize a gas as the fluid. A liquid, however, is usually preferred as the fluid since a given mass of a liquid has a relatively constant volume over substantial variations in temperature and pressure and the use of a liquid results in a substantial simplification in the design of the joint. Suitable liquids include water, alcohols such as aliphatic alcohols, and glycols, lubricating oils and greases of varying viscosities. Basically, almost any fluid can be used provided it is relatively stable and relatively nonreactive chemically with the other elements of the joint which may contact the fluid. The choice of a particular liquid should, of course, be consonant with the operating requirements of the device. Water, for example, would be suitable for a device which would not be subject to extremes of temperature. Low freezing and high boiling liquids such as ethylene glycol or various types of oils would be suitable where greater extremes of temperature are encountered. In addition, the viscosity of the fluid can be a parameter for selection; low viscosity liquids such as water or ethanol provide for easier actuation whereas higher viscosity liquids tend to provide an oscillation damping effect on the joint which may, in some cases, be desirable.

While the fluid support membrane bladder 37 may enclose the entire volume of the recess, the membrane 37 need not completely enclose the fluid. The only design requirement is that a sufficient amount of membrane be present to confine the fluid and to provide rolling seal means between the plug means and the receptacle means at all design extremes of angular deflection of the joint.

Figure 3:
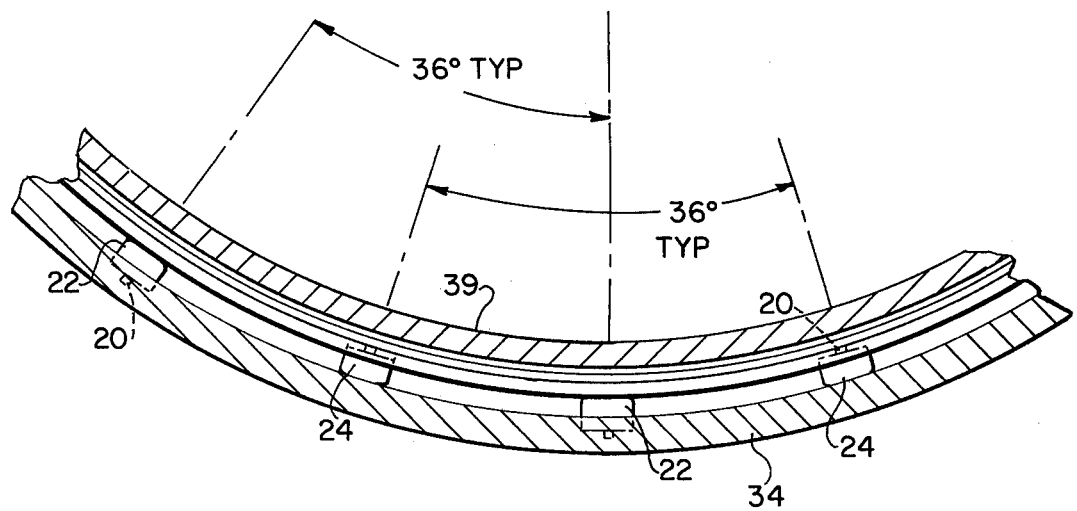
FIG. 3 is a transverse sectional view of that portion of the bearing of FIG. 1 along line 3—3 which illustrates the location of the tabs, segments or rings of the invention.

In order to maintain a predetermined spacing between the outer surfaces of the annulus plug and the surrounding annulus surfaces of the walls 38 and 39 of the housing, which correspond to the rolling surfaces of the bearing between which the bladder is positioned, and without reducing design angular clearance to thereby prevent a change in the diameter of the bladder seal membrane 37 and consequent destruction thereof due to pinching caused by side movement of the plug (as a result of angular movement of the movable nozzle) there is provided according to the invention a series of spaced tabs 22 on the wall of the plug and a similar series of spaced tabs 24 on the adjacent wall of the housing positioned to one side of the bladder walls, as seen in FIGS. 1 and 2. The tabs of both series are interleaved in the manner shown in FIGS. 1, 2 and 3.

The tabs may be made of Teflon and constitute transverse stiffness elements. They have a flat end which is placed in milled slots on the circumference of the annular plug and on the confronting surfaces of walls 38 and 39, either on the inner diameter and/or outer diameter of the plug and the walls of elements 38, 39 as shown in the drawings. The other end of the tabs is smoothly rounded to engage a confronting rolling surface with a minimum of friction therebetween. Screws 20 shown in the top view of FIG. 3 taken along line 3—3 of FIG. 1 or any suitable bonding agent affix the flat ends of the Teflon tabs to the peripheries of the rolling confronting surfaces of the plug and the walls of elements 38 and 39.

FIG. 1 shows the two series of interleaving tabs on one side of the annulus plug, while FIG. 2 shows the two series on the other side of the annulus plug. If desired, the series of tabs may be located on both sides of the annulus plug though this is not preferred because of the increase in torque penalty (friction loss) as the plug moves relative to its surrounding walls. A minimum number of spaced tabs is preferred to reduce this friction or rubbing loss.

The term "tabs" used herein and in the appended claims is deemed to include segments or rings for achieving the same results.

OPERATING CHARACTERISTICS

The stiffness augmentation desired is related to the geometry and material properties of the teflon tabs, segments, or rings as follows:

$$\Delta K_y = C_1 E A / t$$

where $\Delta K_y$ is the stiffness augmentation

E is the compressive modulus of elasticity of the Teflon

A is the compressed area t is the thickness of the pad $C_1$ is the circumferential distribution constant which is a function of the number and location of the tabs, segments, or rings.

The rotational torque penalty associated with the bearing is a function of the compression of the tabs, segment, or ring. In general, this compression is maximum at TECHROLL seal pressure equal to maximum expected operating pressure.

The torque penalty at maximum pressure is as follows:

$$\Delta T = C_2 \, \mu_c \sigma_c A \, R$$

where
- $\Delta T$ is the increased torque
- $C_2$ is a moment arm distribution constant
- $\mu$ is the friction coefficient between Teflon and the rubbing surface
- $\sigma_c$ is the maximum compressive stress in the Teflon
- A is the total area of the Teflon tabs, segments, or rings, in contact
- R is the radius to the bearing from the TECHROLL seal axis of symmetry.

The tabs of the invention may be employed, by way of example only, in apparatus of the type described herein where the pivot point in nozzle throat area is employed as the nozzle joint and seal for a rocket motor. A rolling seal diaphram with an O.D. of 8.875 inches and a I.D. of 6.125 inches and formed of rubber reinforced nylon fabric having a total thickness of 0.093 inches can be used. The width of each convolute may be approximately 0.33 inches. The fluid employed may be a silicone oil. The motor may be fired at 555 psi chamber pressure producing about 1,000 pounds of thrust so as to deflect the nozzle in different directions uo to 6°. The pressure within the seal during operation could be about 1075 psi which will be successfully resisted by the membrane.

The term "tab" as used in the appended claims is deemed to include any segment or abutment which limits the amount of movement between confronting relatively movable surfaces of a joint.

Obviously, many modifications and variations of the present invention are possible in light of the above teachings. It is therefore to be understood that, within the scope of the appended claims, the invention may be practiced otherwise than as specifically described.

What is claimed is:

1. In a universal joint having 2 spaced-apart members to be connected together for relative axial and angular movement, an annular plug affixed to one of said members, an annular fluid-filled flexible membrane in the space between said plug and the other member, means attaching the central wall portion of said membrane to said plug, whereby relative movement of said plug effects movement of said membrane to provide a fluid bearing rolling seal between said plug and the surface of said other member, the surfaces of said membrane defining convolute rolling surfaces, and spaced tabs affixed to said plug and acting as transverse stiffness augmentation bearings for maintaining a minimum distance between said annular plug and said other member.

2. A universal joint according to claim 1, wherein spaced tabs are also affixed to said other member, and the tabs on said plug are interleaved with the tabs on said other member.

3. A universal joint as defined in claim 1 wherein membrane is formed of rubber reinforced nylon with an outer diameter of approximately 8.875 inches an inner diameter of approximately 6.125 inches and a total thickness of 0.093 inches, the fluid within said membrane being silicone oil.

4. A universal joint having two spaced-apart surfaces defining a recess, annular rolling sealing means in the form of a convoluted fluid supported membrane between said surfaces and within said recess, and spaced interleaved tabs on and between said surfaces constituting transverse stiffness augmentation bearings.

5. A joint comprising a receptacle formed by two spaced walls defining a recess, an annular plug extending between and spaced from said walls, a rolling seal in the form of a convoluted fluid supported membrane between said annular plug and said walls, means securing said plug to one portion of said membrane and said walls to an oppositely located portion of said membrane, and tabs affixed to one surface of said plug and an adjoining surface of one of said walls, said tabs being spaced apart and interleaved to constitute transverse stiffness augmentation bearings.

6. In a movable nozzle reaction motor comprising a combustion chamber, a nozzle support structure, a movable nozzle assembly, joint means for supporting said movable nozzle assembly on said fixed nozzle support structure, and means for angularly deflecting the axis of said movable nozzle assembly with respect to said reaction motor, the improvement wherein said joint means comprises:
   a. An annular plug formed on one of said nozzle support structure and movable assembly,
   b. an annular receptacle formed on the other of said fixed nozzle support and movable nozzle assembly, said plug being received in said receptacle in spaced apart relationship therefrom,
   c. convoluted rolling seal means disposed between said plug and annular receptacle and defining a volume therebetween,
   d. a fluid filling said volume, and
   e. spaced tabs affixed to said plug in a circumferential direction to maintain a predetermined spacing said plug and said fixed nozzle support.

7. A universal joint having two spaced-apart surfaces defining a recess, annular rolling sealing means in the form of a convoluted fluid-supported membrane between said surfaces and within said recess, and spaced tabs between and affixed to at least one of said surfaces constituting transverse stiffness augmentation bearings.

8. A joint comprising two surfaces spaced from and relatively movable with respect to each other, rolling means between said surfaces permitting relative angular deflection thereof, and a plurality of spaced tabs between said surfaces and affixed to at least one of said surfaces for limiting the extend of movement of said surfaces toward each other.

* * * * *